(12) United States Patent
Schweigert

(10) Patent No.: US 7,466,081 B2
(45) Date of Patent: Dec. 16, 2008

(54) EMERGENCY LIGHTING

(75) Inventor: Harald Schweigert, Vienna (AT)

(73) Assignee: Siemens AG Österreich, Vienna (AT)

( * ) Notice: Subject to any disclaimer, the term of this patent is extended or adjusted under 35 U.S.C. 154(b) by 431 days.

(21) Appl. No.: 11/221,034

(22) Filed: Sep. 7, 2005

(65) Prior Publication Data
US 2006/0044801 A1 Mar. 2, 2006

Related U.S. Application Data

(63) Continuation of application No. PCT/AT04/00066, filed on Mar. 3, 2004.

(30) Foreign Application Priority Data

Mar. 10, 2003 (AT) ............... A 369/2003

(51) Int. Cl.
*H05B 37/00* (2006.01)
(52) U.S. Cl. ............ 315/86; 315/173; 315/175; 315/247; 315/287; 345/52; 345/46
(58) Field of Classification Search .......... 315/86, 315/87, 170–176, 160, 169.3, 247, 287, 291; 362/20, 800; 345/46, 52, 82
See application file for complete search history.

(56) References Cited

U.S. PATENT DOCUMENTS

| | | | | |
|---|---|---|---|---|
| 4,298,869 | A | * | 11/1981 | Okuno ............. 345/82 |
| 4,544,910 | A | | 10/1985 | Hoberman |
| 4,843,300 | A | * | 6/1989 | Alderman ............. 323/224 |
| 5,298,750 | A | * | 3/1994 | Rericha ............. 250/338.5 |
| 5,303,124 | A | * | 4/1994 | Wrobel ............. 362/20 |
| 5,722,852 | A | * | 3/1998 | Miek ............. 439/417 |
| 5,739,639 | A | | 4/1998 | Johnson |
| 5,955,843 | A | * | 9/1999 | Nuckolls et al. ............. 315/86 |
| 6,121,694 | A | | 9/2000 | Thereze |
| 6,137,276 | A | | 10/2000 | Rudolph |

FOREIGN PATENT DOCUMENTS

| | | |
|---|---|---|
| DE | 4222994 A1 | 1/1994 |
| DE | 19518782 A1 | 12/1995 |
| DE | 19706568 A1 | 8/1998 |
| DE | 20019847 U | 2/2001 |
| EP | 0411388 A | 2/1991 |

(Continued)

OTHER PUBLICATIONS

Search Report, AT 369/2003 Apr. 13, 2004 (3 pages) (Translation—3 pages).

(Continued)

*Primary Examiner*—Haissa Philogene
(74) *Attorney, Agent, or Firm*—Anton P. Ness; Fox Rothschild LLP

(57) ABSTRACT

An emergency lighting with an electrical illuminant (DL1, DL2, DL3), which, as a power supply drops below a predeterminable value, can be connected to an energy source that can be charged from the power supply by means of a charging connection, for example, by means of an electronic switch (T1), where the energy source consists of at least one high-capacity storage condenser (CS; CS1, CS2) and where light-emitting diodes can be provided as illuminants.

17 Claims, 3 Drawing Sheets

FOREIGN PATENT DOCUMENTS

| | | |
|---|---|---|
| GB | 1116941 A | 6/1968 |
| GB | 2097 610 A | 11/1982 |
| JP | 10136586 | 10/1996 |
| JP | 10262346 | 3/1997 |
| JP | 2000 097783 A | 4/2000 |
| WO | WO 91/11896 | 8/1991 |

OTHER PUBLICATIONS

First Office Action, China Application No. 200480006556.6 dated Feb. 9, 2007 (2 pages) Translation (3 pages).

McClure M et al; "Constant Imput Power Modulation Technique for High Efficiency Boost Converter Optimized for Lithium-Ion Battery Application" applied Power Electronics Conference and Exposition 1996. APEC '96 Conference proceeding 1996, Eleventh Annual San Jose, CA, USA Mar. 3-7, 1996, New York, NY, USA, IEEE, US, Mar. 3, 1996 (pp. 850-855).

Written Opinion Preliminary Searching Authority (5 pages) Jun. 7, 2004 (translations of pertinent portions 5 pages).

International Search Report Dated Jun. 7, 2004 (7 pages).

* cited by examiner

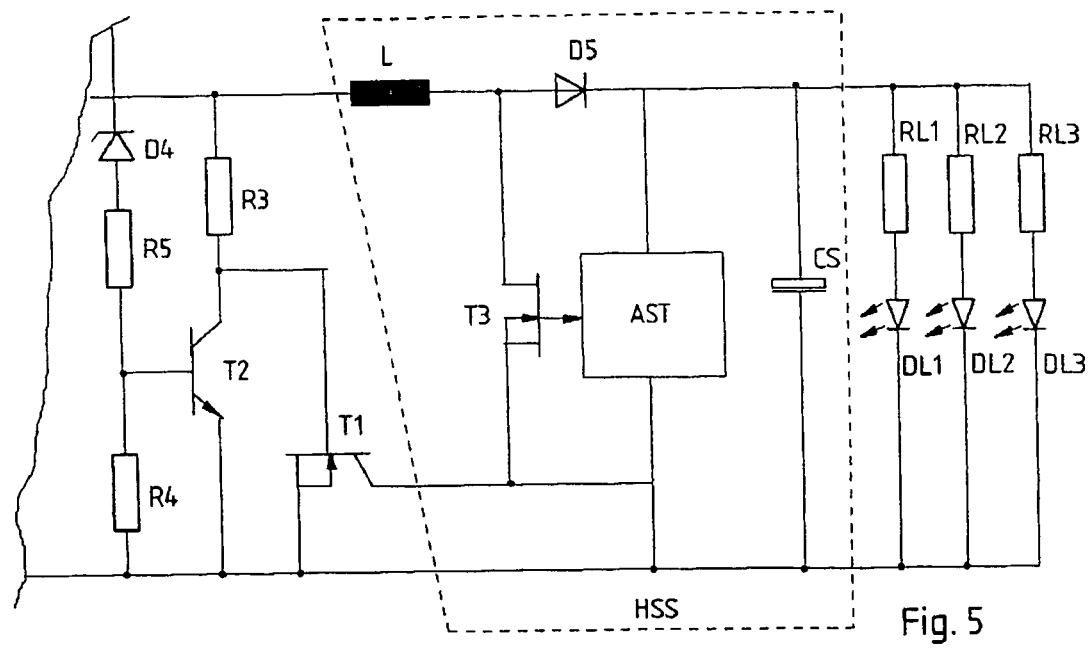
Fig. 5
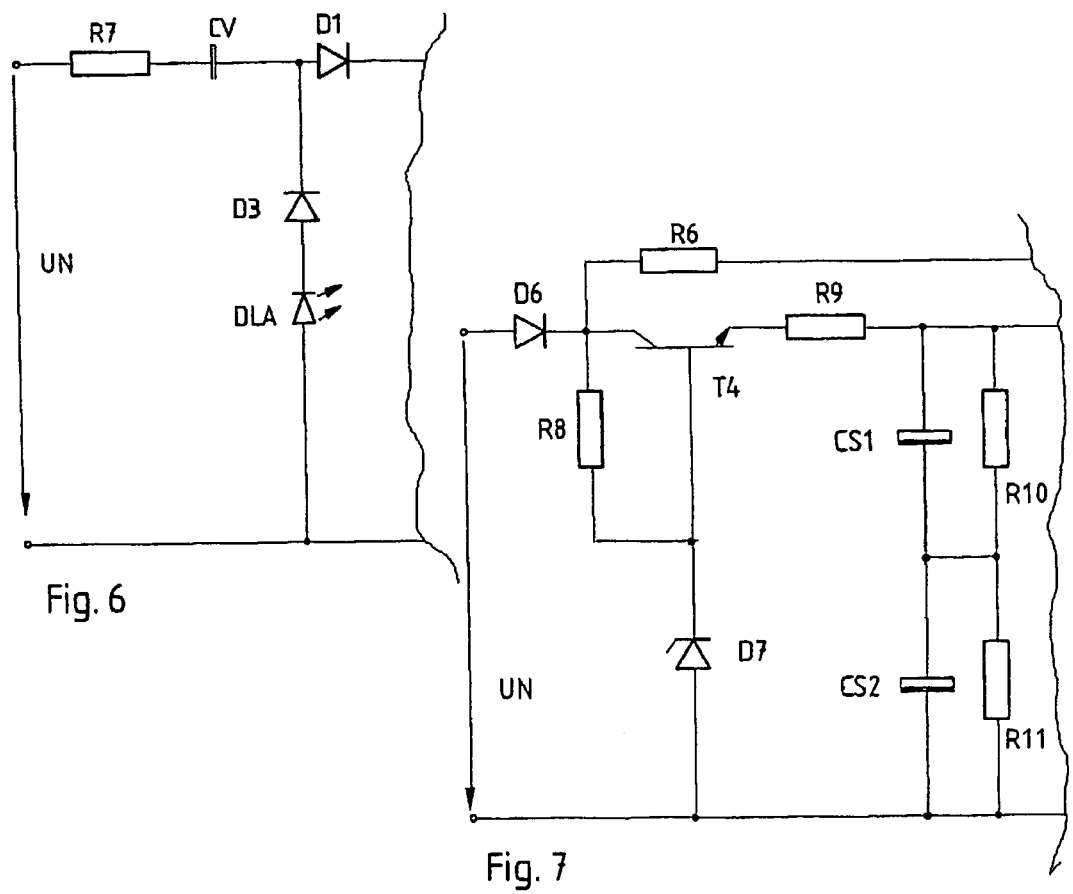
Fig. 6
Fig. 7

EMERGENCY LIGHTING

CROSS-REFERENCE TO RELATED APPLICATIONS

This application claims the benefit of PCT Application No. PCT/AT2004/000066 filed Mar. 3, 2004 which in turn claims priority from Austrian Patent Application No. A 369/2003 filed Mar. 10, 2003.

FIELD OF THE INVENTION

This invention relates to emergency lighting with an electrical illuminant, which, as the power supply drops below a predetermined value, can be connected from the power supply to an energy source that can be charged by means of a charging connection.

BACKGROUND OF THE INVENTION

In case of power failure, emergency lighting should produce mostly locally limited light for a limited period of time in order, for example, to help people get oriented and to make it possible to initiate certain measures. By "power grid" we mean here primarily alternating-voltage power grids with, for example, 230 V, but also direct-voltage power grids with voltages of, for example, 24 or 48 V.

Emergency lighting is often prescribed by law in industry and in the public sector. In that connection, one primarily employs storage batteries for the purpose of power grid buffering, for example, for fluorescent lamps at emergency exits. In this connection, it must be noted that the use of storage batteries is relatively expensive and frequently requires maintenance, so that emergency lighting is often dispensed with, provided it is not prescribed by law.

BRIEF SUMMARY OF THE INVENTION

The starting point of this invention is the specific problem of emergency lighting of or in switch cabinets. Automatic cutouts and fault-current breakers are triggered relatively frequently in a household environment either due to triggering conditions inside the house or because of transient overvoltages in the power grid. When there is no daylight, this kind of triggering of cutouts results in a more or less confused search for flashlights, cigarette lighters, matches or candles in an effort to find and reset the flipped switch in the switch cabinet.

One object of the invention is to provide a simple, reasonably priced and maintenance-free emergency lighting unit that will be particularly suitable for switch cabinets and fuse boxes, and so forth.

This problem is solved with emergency lighting of the kind mentioned initially where, according to the invention, the power source consists of at least one high-capacity storage condenser.

The emergency lighting according to the invention is practically maintenance-free, inexpensive and can be housed in such a switch cabinet without any problems and without any need for any special measures in the fuse box as such; adequate illumination time is provided also when the device is housed in a standardized small housing.

Although the condenser could be connected to the illuminant also via a relay, it is advantageous that at least one storage condenser can be connected via an electronic switch to the illuminant where the switch is controlled by a power-supply detection circuit.

Reasonably priced storage condensers with a very high capacity, for example, 22 Farad, often present only low operating voltages that are too weak for quite a few illuminants; it can therefore be advantageous when a high-setting device is series-connected in front of the illuminant. Due to the low voltage on the storage condenser, it is advantageous here when the high-setting device has a triggering/regulating circuit whose operating voltage is taken from the high-set output to which the illuminant is connected.

It is furthermore practical when the illuminant has at least one light-emitting diode because, along with the high efficiency, light-emitting diodes also have a very long service life.

A simple charge connection can be made in the following manner: At least one storage condenser is applied via a protective resistor to the power supply or to a direct voltage diverted from the latter and where a voltage limiter is connected in parallel with at least one condenser. The protective resistor can be an ohmic resistance or it can also contain at least one condenser.

In the case of alternating-voltage power grids, it is advisable to place a rectifier diode between the protective resistor and at least one storage condenser in order to obtain a direct voltage in a simple manner. If the point of connection between the protective resistor and the rectifier diode is connected with the other pole of the alternating voltage via an auxiliary diode that is poled opposite to the rectifier diode, then one gets a simple overvoltage protection because, in this case, overvoltages are wiped out in the protective resistor, which is more voltage-stable than the semiconductor components. This provides a simple possibility for displaying the operating state when a light-emitting diode is connected in series with the auxiliary diode to display the alternating operating voltage.

Charging the storage condenser can be controlled effectively, especially in low-voltage direct-voltage power grids if the power supply—or in case of an alternating power supply, the rectified power supply—is conducted via a voltage regulation circuit to at least one storage condenser. The voltage regulation circuit in a practical manner has a longitudinal transistor that is regulated by means of a breakdown diode.

The electronic switch is advantageously a switching transistor; in this case, it is advantageous when the power-supply detection circuit for the comparison of a direct voltage derived from the power supply with a reference voltage has a breakdown diode via which, during routine operation, a base current flows into a driving transistor of the switching transistor.

The emergency lighting according to the invention can be implemented in a highly practical manner for employment in switch cabinets when its circuitry is housed inside a housing that is attached to top-hat rails, where the light of the electrical illuminant is conducted via a light conductor out of the housing and is distributed by means of prisms or the like.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 5 shows a variant of the circuit according to FIG. 4 with a high-set device;

FIG. 6 shows a variant of the circuits according to FIG. 4 or FIG. 5 with an additional condenser; and FIG. 7 shows another variant of the circuits according to FIG. 4 or FIG. 5 with a longitudinal regulating transistor in the input.

DETAILED DESCRIPTION OF THE INVENTION

Figure 1:
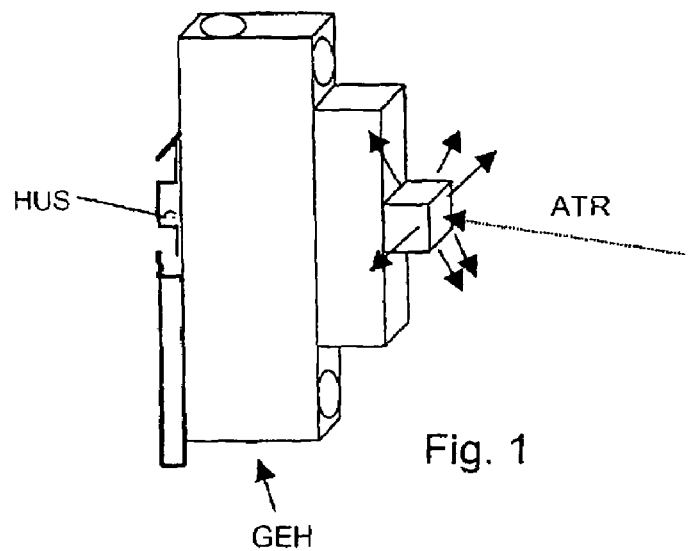
FIG. 1 is a pictorial presentation of an emergency lighting device according to the invention that is built into a housing that can accept top-hat rails.

In the drawings, like numerals indicate like elements throughout. In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Figure 2:
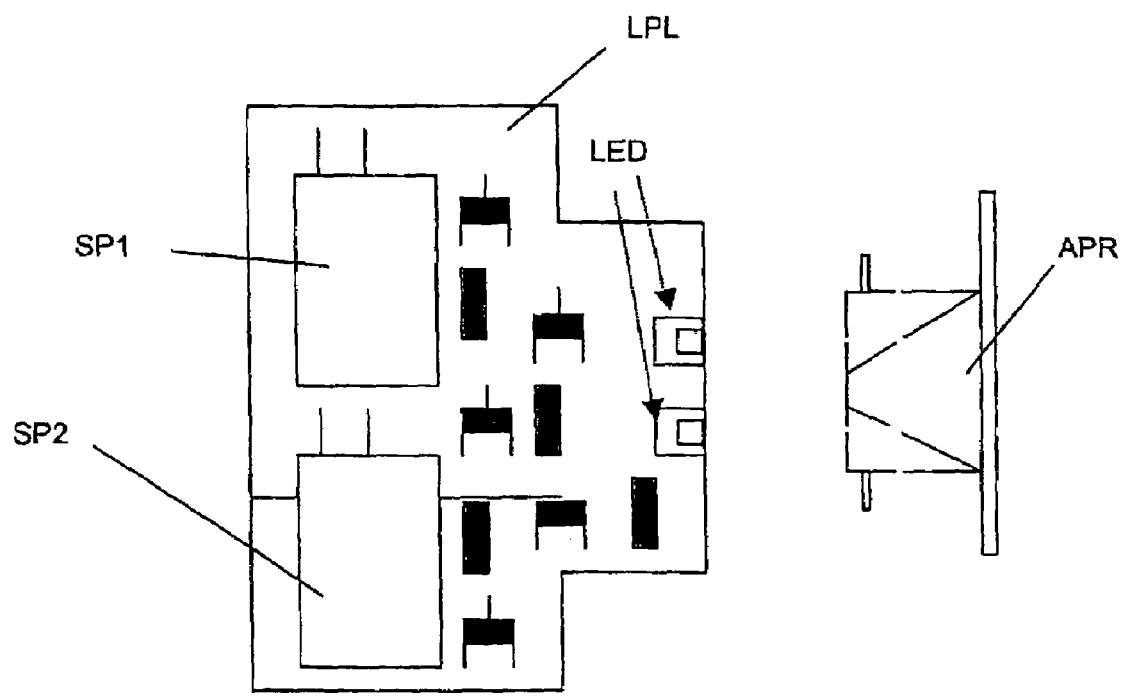
FIG. 2 is an enlarged diagram, illustrating an interior view of the emergency lighting according to FIG. 1.

FIG. 1 shows a possible mechanical structure of an emergency lighting device according to the invention where the circuit of the emergency lighting is in a housing GEH that is capable of accepting top-hot rails, that is to say, that, like the customary safety cutouts or fault-current switches, can be attached in a switch cabinet with the help of a top-hat rail HUS. FIG. 2 shows that the circuit of the emergency lighting is on a printed circuit board LPL that is placed inside the housing GEH. Essential components that will be explained in greater detail later on here consist of two storage condensers SP 1 and SP 2 as well as light-emitting diodes LED, whose light is deflected via an acrylic glass prism APR in the manner shown, essentially perpendicularly to the front or rear surface of the switch cabinet.

Figure 3:
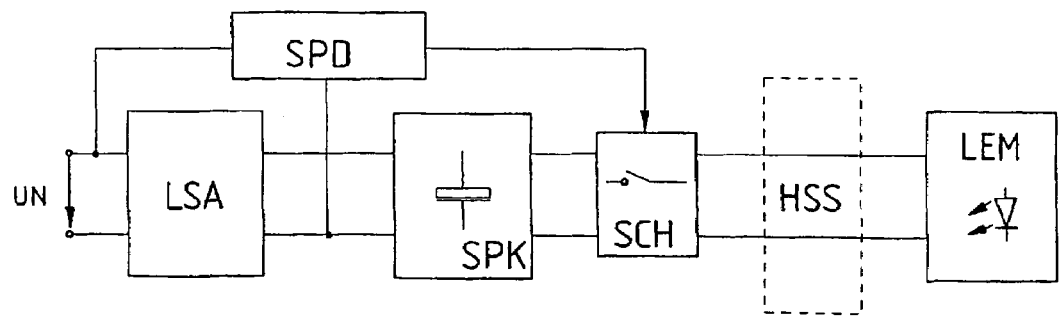
FIG. 3 is a block diagram of an emergency lighting device according to the invention.

FIG. 3 shows the basic circuitry of the invention-based emergency lighting. A power supply UN, either an alternating voltage of, for example, 230 V, or a direct voltage of, for example, 14 or 42 V, is supplied to a charging connection LSA, which is connected with a storage condenser SPK. Between an illuminant LEM and the storage condenser SPK lies a controlled switch SCH that is connected with the help of a voltage detector SPD to the illuminant and then to the storage condenser SPK when the power supply UN has fallen below a certain value. The term "storage condenser" is not to be interpreted as a restriction to a single condenser but instead also comprises a condenser bank consisting of several individual condensers that are connected parallel and/or in series.

Figure 4:
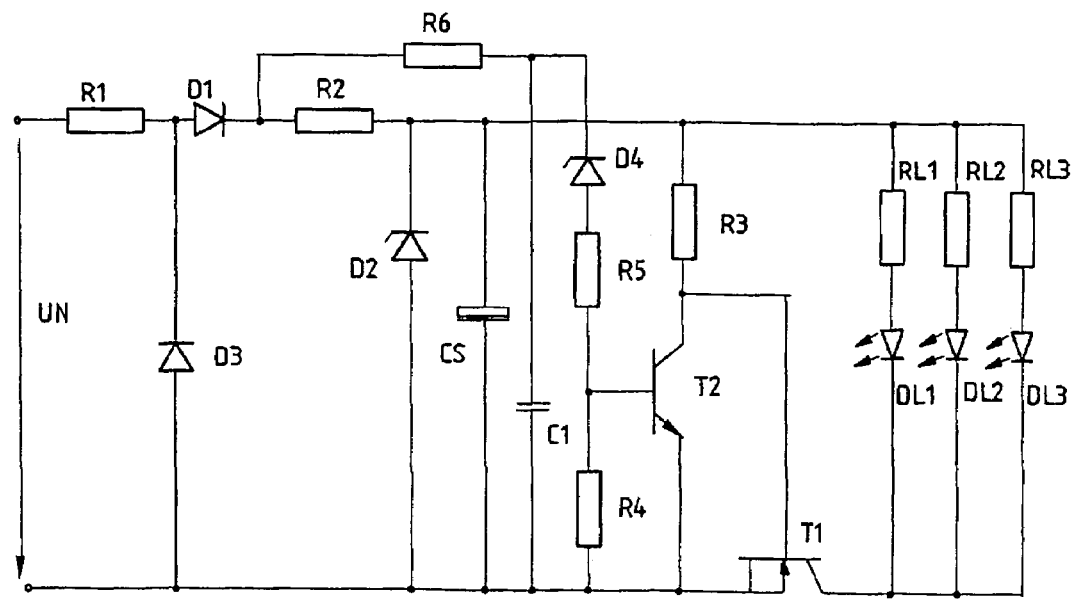
FIG. 4 shows the circuit of a first embodiment of an invention-based emergency lighting.

FIG. 4 shows a circuit of an emergency lighting according to the invention that is suitable above all for alternating power-supply voltages. The input voltage UN is supplied via a protective resistor R1 to a rectifier diode D1 and here is moved via another resistance R2 to a voltage-stabilizing breakdown diode D2 to which a storage condenser CS is connected in parallel. In this way, the storage condenser CS can be charged and, in that connection, one gets practical efficient values, for example, for R1 on the order of magnitude of 100 to 200 kOhm, for R1 on the order of magnitude of 50 kOhm and for CS on the order of magnitude of 10 F, which values, for example, are 2.5 V. A protective diode D3, which runs to ground from the connection point of the protective resistor R1 and the rectifier diode D1, causes negative transient power grid overvoltages to be destroyed primarily in the protective resistor R1. Positive voltage peaks in the power grid merely result in an increased charging of the storage condenser CS or the charging is limited by the breakdown diode D2. A transistor T1 is used as a controlled switch and that transistor T1 is triggered by an NPN transistor T2 with a collector resistance R3. A resistance R4 runs to the ground from the base of transistor T2 and a resistance R5 is connected via a breakdown diode D4 and another resistance R6 with the direct-voltage point behind the rectifier diode D1. The values for resistances R3, R4, R5 and R6 can, for example, be on the order of, respectively, 1 MOhm, 100 kOhm, 500 kOhm and 100 kOhm. The breakdown diode D4 can have a breakdown voltage of 2.2 V and a condenser C1, connecting the connection point between resistance R6 and breakdown diode D4 with the ground, can have a value of, for example, 100 nF. This condenser is intended to prevent spurious releases in case of brief power-grid disturbances. The breakdown diode D4 that is critical for the voltage detector circuit, for example, can have a breakdown voltage of 33 V if one starts with a customary power supply of 230 V. As the power supply drops below a predetermined value, which is determined by the displayed voltage divider and the value of the breakdown voltage of diode D4, switching transistor T1, controlled by transistor T2, will switch through and will apply the voltage of 2.2 V pertaining to the storage condenser CS to several, in this case, three, light-emitting diodes DL1, DL2, DL3 that are connected in series with a respective one of protective resistors RL1, RL2, RL3.

One can readily see that with the help of emergency lighting as explained in FIGS. 1 to 4 in case of a power failure, a fuse box will be illuminated over a span of time that will be enough to return the switches back to their starting positions, etc. To keep the sustained losses small, one practicably works with a small charge current that in combination with the high capacity of the storage condenser will result in charging times within a range of hours. The voltage detector circuit is intended to make sure that the light-emitting diodes will be connected only when the power supply falls below a previously set value, for example, 150 V. When one uses, for example, four light-emitting diodes and one storage condenser with a capacity of 10 to 20 Farad, then one can achieve adequate illumination of the switch cabinet for a period of about 10 minutes.

FIG. 5 shows a variant of the circuit shown in FIG. 4, where, in the circuit portion illustrated, is shown encircled that part that deviates from the circuit according to FIG. 4. Switch T1, controlled by the voltage-detector circuit that is characterized by the breakdown diode D4, in this case applies the voltage of the storage condenser to a high-set device of the known design that in this case consists of a storage inductivity L, a controlled switch T3 and a trigger circuit AST for that switch, a rectifier diode D5 as well as a storage condenser CS. With the help of the high-set device, one can then raise a small voltage on the storage condenser CS that possibly may not be enough to operate the illuminants used to any desired high figure, which will suffice for the operation of the particular illuminant. With the help of the high-set device, one can make better use of the energy stored in condenser CS because the high-set device HSS can discharge condenser CS down to very low voltages. As a result, for example, the threshold effect (minimum operating voltage) that is present in light-emitting diodes is eliminated. Below a certain voltage, a relatively large residual charge would remain in the storage condenser if there were no high-set adjuster. The use of the high-set adjuster can also most extensively utilize the residual charge, something that increases the illumination time of the illuminant. It might be mentioned at this point that light-emitting diodes, of course, do represent a preferred embodiment of the illuminant, but that, on the other hand, one can also use other illuminants such as incandescent bulbs or gas discharge lamps.

A possibility of increasing the charge current without enlarging the effective losses consists in using a capacitive protective resistor. FIG. 6 shows such an embodiment where the protective resistor consists of the series connection of a resistor R7 and a condenser CV, where the resistor R7 can be on the order of magnitude of 50 kOhm and the condenser CV can be on the order of magnitude of 22 nF. Naturally, this embodiment is possible only in case of an alternating power voltage, although one must keep in mind that, using the condenser CV, power supply breakdowns of higher frequency can have harmful effects on the circuit if the latter is not accordingly dimensioned in a voltage-stable fashion. The embodiment according to FIG. 6 furthermore shows that a light-emitting diode DLA can be connected in series with the protective diode D2 that is already known from FIG. 4, which light-emitting diode DLA is used to display the operating voltage. The right part of the circuit can then be executed as shown in FIG. 4 or FIG. 5 and is not displayed in detail.

If the power supply is a direct voltage, for example, 14, 42 or 110V, then in a practical manner, the storage condenser can be charged also by means of a longitudinal regulator. Such a variant is shown in FIG. 7 where again only the critical part of the circuit is shown here. The right part of the circuit, not shown, can be made, for example, according to FIG. 4 or FIG. 5. The direct power supply voltage is supplied to the circuit via a reverse protection diode D6 and via a longitudinal transistor T4, and a resistance R9 gets to the storage condenser, which in this case is made as a series connection of two storage condensers CS1, CS2 with the particular balancing resistances R10 and R11. If one uses commercially available condensers with 2.3 V and 10 F, then one gets a voltage—available for illumination purposes—on the order of magnitude of 5 V. The longitudinal transistor T4 is in the known manner regulated at its base via the voltage that is applied to the breakdown diode D7 with its protective resistor R8. The breakdown diode, for example, has a breakdown voltage of 5 V, while its protective resistor R8 has a value of 1 MOhm, and resistance R9, which is used as a countercoupling resistance, has a value of about 100 Ohm. The last-mentioned resistance limits the charging process to an acceptable current that depends on the load capacity of the longitudinal transistor T4 that is used.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An emergency lighting with an electrical illuminant, which, as a line voltage drops below a predeterminable value, is connected via an electronic switch, controlled by a line voltage detection circuit to an energy source that can be charged from the line voltage by means of a charge circuit, and a step-up converter is connected before the illuminant, characterized in that:
the energy source is at least one high-capacity storage condenser and a voltage regulator is provided for the voltage across the at least one high-capacity storage condenser.

2. An emergency lighting according to claim 1, characterized in that the step-up converter includes a trigger/control circuit whose operating voltage is taken from the stepped up voltage to which the illuminant is connected.

3. An emergency lighting according to claim 1, characterized in that the illuminant includes at least one light-emitting diode.

4. An emergency lighting according to claim 1, characterized in that the at least one storage condenser is connected to the line voltage, or to a direct voltage derived form the line voltage, via a dropping resistor.

5. An emergency lighting according to claim 4, characterized in that a rectifier diode is connected between the dropping resistor and the at least one storage condenser.

6. An emergency lighting according to claim 5, characterized in that the connection point between the dropping resistor and the rectifier diode is connected to the other pole of the alternating voltage via a protective diode poled oppositely to the rectifier diode.

7. An emergency lighting according to claim 6, characterized in that a light emitting diode is connected in series with the protective diode to indicate the AC-line voltage.

8. An emergency lighting according to claim 5, characterized in that the dropping resistor is an ohmic resistor.

9. An emergency lighting according to claim 5, characterized in that the dropping resistor includes a condenser.

10. An emergency lighting according to claim 1, characterized in that the line voltage or the rectified line voltage is fed via a voltage regulation circuit to the at least one storage condenser.

11. An emergency lighting according to claim 10, characterized in that the voltage regulation circuit includes a longitudinal transistor controlled by a Zener diode.

12. An emergency lighting according to claim 1, characterized in that the electronic switch is a switching transistor.

13. An emergency lighting according to claim 12, characterized in that the line voltage detection circuit includes, for comparison of a DC-voltage derived form the line voltage with a reference voltage, a Zener diode, whereby, in a normal operation mode, a base current of a driver transistor of the switching transistor flows via said Zener diode.

14. An emergency lighting according to claim 1, characterized in that its circuitry is placed with a housing that is attachable on top-hat rails, the light of the illuminant being conducted via a light conductor out of the housing and distributed by means of prisms or the like.

15. An emergency lighting with an electrical illuminant, which, as a power supply drops below a predeterminable value, is connected to an energy source that can be charged from the power supply by means of a charge connection, characterized in that:
the energy source is at least one high-capacity storage condenser, the at least one storage condenser is connected via an electronic switch to an illuminant where the switch is controlled by a power supply detection circuit, and the power supply detection circuit for the comparison of a direct voltage derived from the power supply with a reference voltage has a breakdown diode via which, during routine operation, a base current will flow into a driving transistor of a switching transistor.

16. An emergency lighting with an electrical illuminant, which, as a power supply drops below a predeterminable value, is connected to an energy source that can be charged from the power supply by means of a charge connection, and is for operation on an alternating power supply voltage, characterized in that:

the energy source is at least one high-capacity storage condenser, the at least one storage condenser is applied via a protective resistor to the power supply or to a direct voltage derived from the latter and where a voltage limiter is connected parallel to at least one condenser, a rectifier diode is disposed between the protective resistor and at least one storage condenser, and a connection point between the protective resistor and the rectifier diode is connected with the other pole of the alternating voltage via a protective diode, which is poled opposite to the rectifier diode.

17. An emergency lighting according to claim 16, characterized in that a light-emitting diode is connected in series with the protective diode to display the alternating operating voltage.

* * * * *